(12) United States Patent
Davis (10) Patent No.: US 12,017,792 B2
(45) Date of Patent: Jun. 25, 2024

(54) SYSTEM AND METHOD TO CHANGE MAP RANGE OF AIRPORT MOVING MAP

(71) Applicant: Rockwell Collins, Inc., Cedar Rapids, IA (US)

(72) Inventor: Jason Davis, Marengo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 508 days.

(21) Appl. No.: 17/210,047

(22) Filed: Mar. 23, 2021

(65) Prior Publication Data
US 2021/0316879 A1 Oct. 14, 2021

Related U.S. Application Data

(60) Provisional application No. 63/009,490, filed on Apr. 14, 2020.

(51) Int. Cl.
*B64D 43/02* (2006.01)
*G06F 3/14* (2006.01)
*G08G 5/00* (2006.01)

(52) U.S. Cl.
CPC .......... *B64D 43/02* (2013.01); *G06F 3/1407* (2013.01); *G08G 5/0047* (2013.01)

(58) Field of Classification Search
CPC .... B64D 43/02; G06F 3/1407; G08G 5/0047; G08G 5/0013; G08G 5/0021; G08G 5/065; G09B 29/106; G01C 23/00
See application file for complete search history.

(56) References Cited

U.S. PATENT DOCUMENTS

| | | |
|---|---|---|
| 5,714,948 A | 2/1998 | Farmakis et al. |
| 5,867,804 A | 2/1999 | Pilley et al. |
| 6,812,858 B2 | 11/2004 | Griffin, III |
| 7,499,794 B1 | 3/2009 | Bailey et al. |
| D615,100 S | 5/2010 | Canu-Chiesa |
| 7,940,210 B2 | 5/2011 | Fly et al. |
| 7,965,223 B1 | 6/2011 | McCusker |
| 7,974,773 B1 | 7/2011 | Krenz et al. |
| 8,159,416 B1 | 4/2012 | Yum et al. |
| 8,193,948 B1 | 6/2012 | Shapiro et al. |

(Continued)

FOREIGN PATENT DOCUMENTS

| | | |
|---|---|---|
| EP | 1988365 A2 | 11/2008 |
| EP | 2000778 B1 | 11/2010 |

(Continued)

OTHER PUBLICATIONS

Extended Search Report for European Application No. 21168118.4 dated Sep. 15, 2021, 9 pages.

*Primary Examiner* — Chong Wu
(74) *Attorney, Agent, or Firm* — Suiter Swantz IP (57) ABSTRACT

A system may include a display and a processor communicatively coupled to the display. The processor may be configured to: output, to the display, a first view of an airport moving map (AMM) having a first map range, the AMM depicting a location of an aircraft on an airport surface; receive aircraft state data and airport surface data; based at least on the aircraft state data and the airport surface data, change the first view of the AMM having the first map range to a second view of the AMM having a second map range; and output, to the display, the second view of the AMM having the second map range.

11 Claims, 6 Drawing Sheets

(56) References Cited

U.S. PATENT DOCUMENTS

| | | |
|---|---|---|
| 8,234,066 B2 | 7/2012 | Wipplinger et al. |
| 8,306,745 B1 | 11/2012 | Clark et al. |
| 8,433,459 B2 | 4/2013 | Michel et al. |
| 8,560,214 B1 | 10/2013 | Krenz et al. |
| 8,698,654 B2 | 4/2014 | He |
| 8,786,467 B2 | 7/2014 | Clark et al. |
| 8,849,477 B2 | 9/2014 | Brinkman |
| 9,000,952 B1 | 4/2015 | VanDerKamp et al. |
| 9,046,369 B2 | 6/2015 | Chytil et al. |
| 9,189,964 B1 | 11/2015 | Rathinam et al. |
| 9,347,794 B1 | 5/2016 | Tiana et al. |
| 9,487,304 B1 | 11/2016 | Bowen et al. |
| 9,517,844 B2 | 12/2016 | Khatwa et al. |
| 9,561,865 B2 | 2/2017 | Marczi et al. |
| 9,718,558 B2 | 8/2017 | Ball et al. |
| 9,779,630 B2 | 10/2017 | Auletto et al. |
| 10,234,303 B1 | 3/2019 | Chandrashekarappa et al. |
| 2008/0275642 A1* | 11/2008 | Clark .................. G01C 23/00 701/457 |
| 2010/0194601 A1 | 8/2010 | Servantie et al. |
| 2010/0250030 A1 | 9/2010 | Nichols et al. |
| 2010/0283636 A1 | 11/2010 | Clark et al. |
| 2013/0231853 A1 | 9/2013 | Feyereisen et al. |
| 2016/0343262 A1 | 11/2016 | Auletto et al. |
| 2017/0261335 A1 | 9/2017 | Hoffman et al. |
| 2019/0004318 A1 | 1/2019 | Descheemaeker et al. |
| 2019/0066523 A1 | 2/2019 | Pesik et al. |

FOREIGN PATENT DOCUMENTS

| | | |
|---|---|---|
| EP | 2854119 A2 | 4/2015 |
| EP | 2610590 B1 | 10/2015 |
| EP | 2854119 B1 | 8/2016 |
| EP | 3446984 A1 | 2/2019 |
| EP | 3476743 A1 | 5/2019 |

\* cited by examiner

SYSTEM AND METHOD TO CHANGE MAP RANGE OF AIRPORT MOVING MAP

CROSS-REFERENCE TO RELATED APPLICATIONS

The present application is related to and claims priority from: U.S. Application Ser. No. 63/009,490, titled SYSTEM AND METHOD TO CHANGE MAP RANGE OF AIRPORT MOVING MAP, filed Apr. 14, 2020. U.S. Application Ser. No. 63/009,490 is herein incorporated by reference in its entirety.

BACKGROUND

Currently, flight crew members spend significant amounts of time changing map ranges while on airport surfaces, which can detract from the flight crew's ability to perform other flight tasks. Flight crews benefit from being able to easily navigate airports to determine where an aircraft is and where the aircraft needs to go. Maps are currently available and used in the field, but use of the maps currently requires manually changing map ranges (e.g., an amount of zoom) to obtain appropriate level of map detail.

SUMMARY

In one aspect, embodiments of the inventive concepts disclosed herein are directed to a system. The system may include a display and a processor communicatively coupled to the display. The processor may be configured to: output, to the display, a first view of an airport moving map (AMM) having a first map range, the AMM depicting a location of an aircraft on an airport surface; receive aircraft state data and airport surface data; based at least on the aircraft state data and the airport surface data, change the first view of the AMM having the first map range to a second view of the AMM having a second map range; and output, to the display, the second view of the AMM having the second map range.

In a further aspect, embodiments of the inventive concepts disclosed herein are directed to a method. The method may include: outputting, by a processor to a display, a first view of an airport moving map (AMM) having a first map range, the AMM depicting a location of an aircraft on an airport surface, wherein the processor is communicatively coupled to the display; receiving, by the processor, aircraft state data and airport surface data; based at least on the aircraft state data and the airport surface data, changing, by the processor, the first view of the AMM having the first map range to a second view of the AMM having a second map range; outputting, by the processor to the display, the second view of the AMM having the second map range; displaying, by the display, the first view of the AMM having the first map range; and displaying, by the display, the second view of the AMM having the second map range.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to, based at least on aircraft state data and airport surface data, change a first view of an airport moving map (AMM) having a first map range to a second view of the AMM having a second map range.

Figure 1:
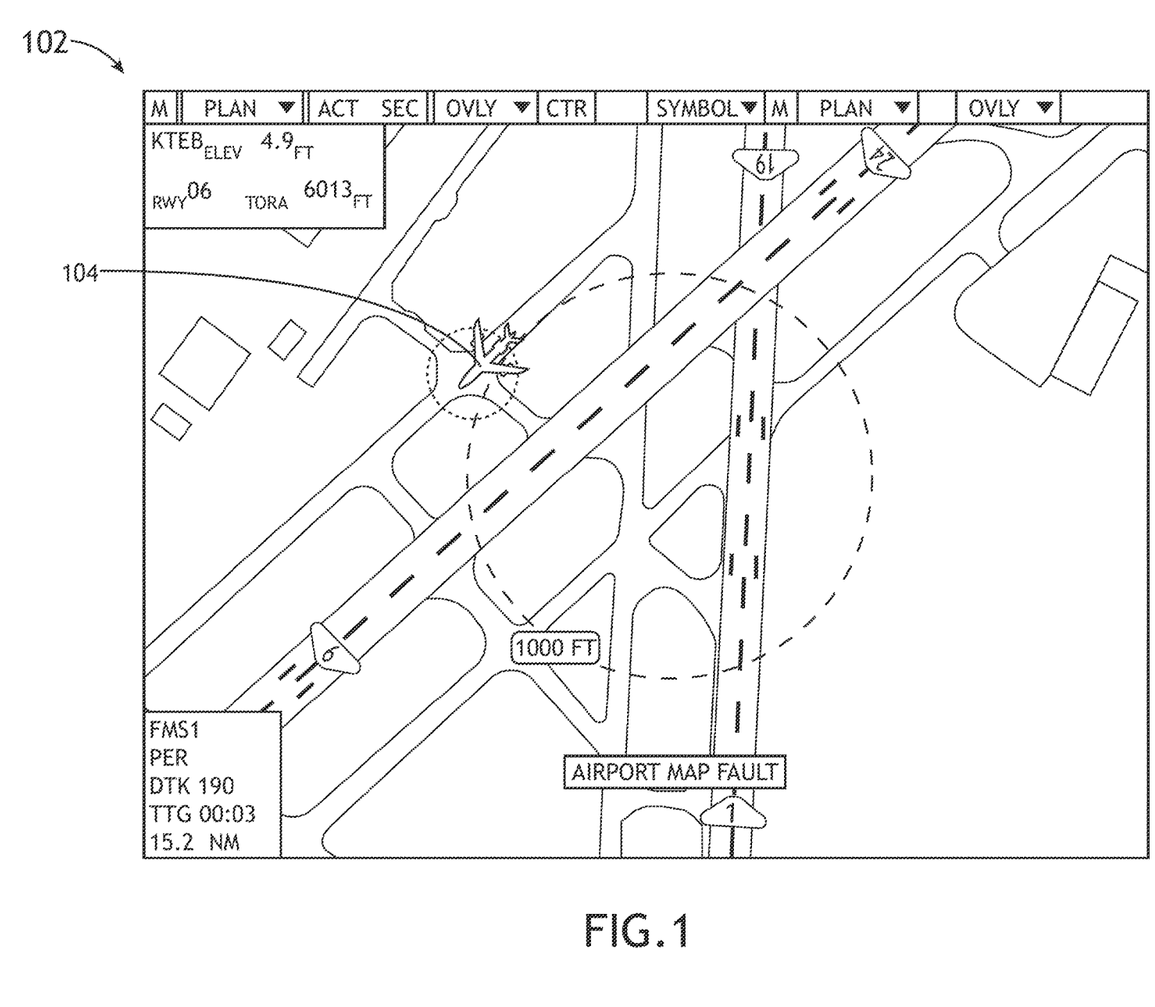
FIG. 1 is an exemplary view of an AMM of an exemplary embodiment according to the inventive concepts disclosed herein.

Referring now to FIG. 1, an exemplary embodiment of an exemplary view 102 of an AMM according to the inventive concepts disclosed herein is depicted. The AMM may include a depiction of an aircraft 104. The AMM may utilize a MFW map window to provide a more detailed view of airport map data (e.g., at ranges below 2 NM). Often, flight crews will utilize the AMM 102 map ranges (e.g., less than 2 NM) to provide a detailed representation of an airport during ground operations. As shown in FIG. 1, the view 102 of the AMM has an exemplary map range. The AMM may provide a given level of detail within the map based on a selected map range (e.g., automatically declutters or clutters map details based on the selected map range).

Figure 2:
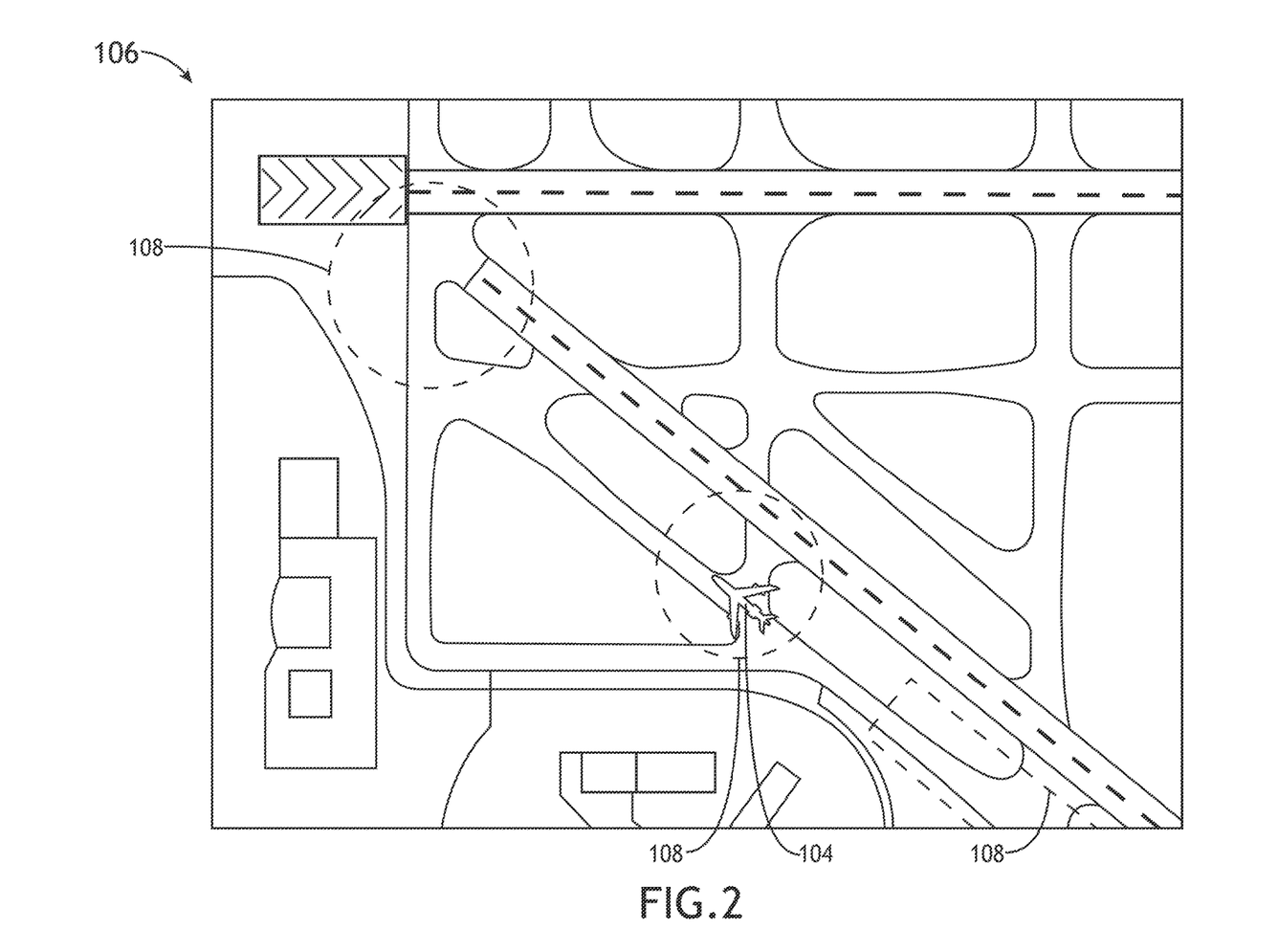
FIG. 2 is a further exemplary view of the AMM of an exemplary embodiment according to the inventive concepts disclosed herein.

Referring now to FIG. 2, an exemplary embodiment of an exemplary view 106 of the AMM according to the inventive concepts disclosed herein is depicted. The AMM 106 may include a depiction of the aircraft 104 and one or more predetermined incursion zones 108 (sometimes referred to as hotspots). The incursion zones may be predetermined areas of an airport surface where a likelihood of a collision is elevated. Locations of incursion zones 108 are included in predetermined airport surface data. As shown in FIG. 2, the view 106 of the AMM has an exemplary map range, which may be different from (e.g., greater than or less than) the map range of the view 102 shown in FIG. 1.

Some embodiments may include the use of airport surface data and sensor data to change (e.g., automatically change) a map range for an AMM. Such sensor data may include current aircraft position, speed (e.g., ground speed, air speed, or tire rotational speed), and/or any other suitable sensor data, which may be used in determining a map range for the AMM.

Some embodiments may reduce an amount of time that flight crew is heads down to manually manipulate map ranges and level of detail while trying to navigate airport surfaces, which can improve safety of ground operations.

Currently, the flight crew is able to set the AMM map range at any time, which corresponds to a set amount of detail provided in the labels. In some embodiments, based on current aircraft state (e.g., position, ground speed, etc.), the system may automatically select the AMM map range to be displayed. For example, when approaching or in an incursion zone (sometimes referred to a hotspot), the system may increase the zoom (e.g., to a predetermined maximum zoom level), which decreases the map range displayed. Additionally, for example, when taxiing in open areas or at higher speeds, a larger map range may be displayed.

Some embodiments may use current aircraft state to determine the AMM map range displayed to the flight crew. Determination of aircraft state for ground operations can come in the form of current aircraft speed (e.g., ground speed), where a relatively slow speed may result in a relatively shorter map range (e.g., higher zoom) with a higher level of detail and where a relatively higher speed may result in a larger map range (e.g., lower zoom) with a lower level of detail. For example, by using predetermined ground speed ranges, the map can step through various available map ranges.

In some embodiments, the detail provided in the map may be determined by current aircraft position as the position relates to airport surfaces such as taxiways, buildings, incursion zones, etc. For example, using global positioning system (GPS) data for aircraft position, a proximity to a portion(s) of airport surfaces (whose locations are already available in predetermined airport surface data) can be utilized to set the AMM map range. For example, as the aircraft position gets closer to hotspots, deicing areas, buildings (e.g., terminals), etc., the map range may decrease (e.g., higher zoom) and provide a higher level of detail in the map. Additionally, for example, as the aircraft position gets farther away from hotspots, deicing areas, buildings (e.g., terminals) and/or onto taxiways, runways, etc., the map range may increase (e.g., lower zoom) and provide a lower level of detail in the map.

Figure 3:
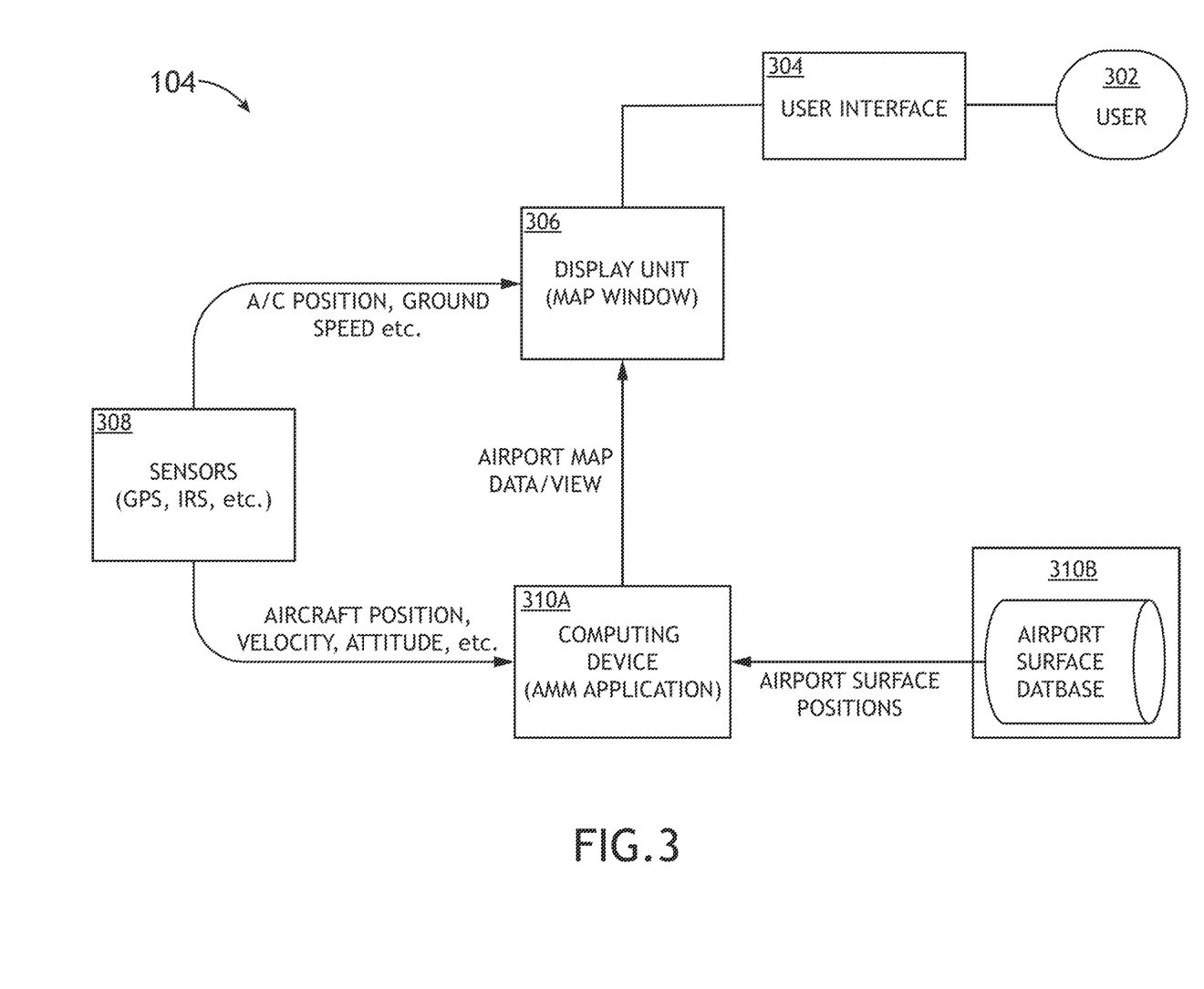
FIG. 3 is a view of an exemplary embodiment of a system including an aircraft according to the inventive concepts disclosed herein.
Figure 4:
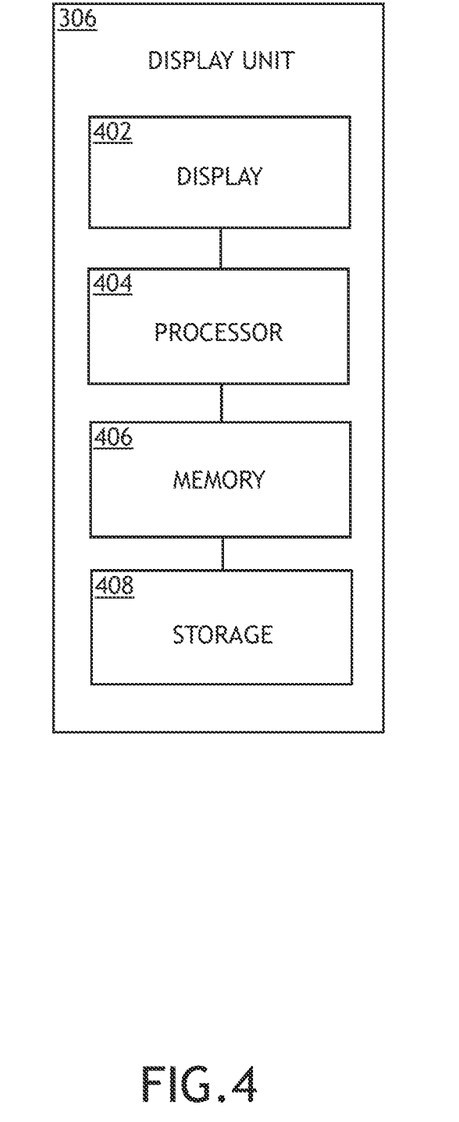
FIG. 4 is a view of an exemplary embodiment of the display unit computing device of FIG. 3 according to the inventive concepts disclosed herein.
Figure 5:
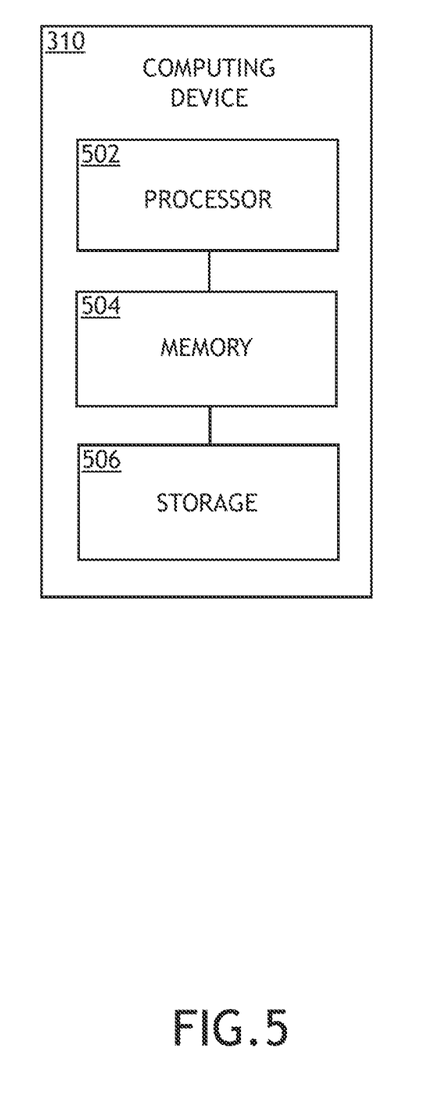
FIG. 5 is a view of an exemplary embodiment of a computing device of FIG. 3 according to the inventive concepts disclosed herein.

Referring now to FIGS. 3, 4 and 5, an exemplary embodiment of a system according to the inventive concepts disclosed herein is depicted. In some embodiments, the system may include the aircraft 104, which may include at least one user 302, at least one user interface 304, at least one display unit computing device 306, sensors 308, at least one computing device 310A, and/or at least one computing device 310B, some or all of which may be communicatively coupled at any given time. In some embodiments, the at least one display unit computing device 306, the at least one computing device 310A, and/or the at least one computing device 310B may be implemented as a single computing device or any number of computing devices configured to perform any or all of the operations disclosed throughout.

The user 302 may be a pilot or crew member. The user 302 may be configured to interface with the system via the user interface 304, for example, to engage, disengage, or override automatic changes to map ranges for the AMM. The at least one user interface 304 may be implemented as any suitable user interface, such as a touchscreen (e.g., of the display unit computing device 306 and/or another display unit), a multipurpose control panel, a cursor control panel, a keyboard, a mouse, a trackpad, a button, a switch, an eye tracking system, and/or a voice recognition system. The user interface 304 may be configured to receive a user selection and to output the user selection to a computing device (e.g., the display unit computing device 306).

The display unit computing device 306 may be implemented as any suitable computing device, such as an MFW computing device. As shown in FIG. 4, the display unit computing device 306 may include at least one display 402, at least one processor 404, at least one memory 406, and/or storage 408, some or all of which may be communicatively coupled at any given time. The processor 404 may be configured to run various software applications (e.g., a map window application) or computer code stored (e.g., maintained) in a non-transitory computer-readable medium (e.g., memory 406 and/or storage 408) and configured to execute various instructions or operations. The processor 404 may be configured to perform any or all of the operations disclosed throughout. For example, the processor 404 may be configured to: receive sensor data from the sensors 308; execute the map window application; receive data and views of the AMM 102, 106; and/or output the views of the AMM to the display 402. The display 402 may be configured to: display a first view of the AMM having a first map range; and display a second view of the AMM having a second map range. For example, the first map range may be greater than or less than the second map range.

The sensors 308 may be any suitable sensors configured to output sensor data to another computing device (e.g., 306, 310A, and/or 310B). For example, the sensors 308 may include any or all of the following: at least one global positioning system (GPS) sensor; at least one inertial reference system (IRS) sensor; at least one throttle position sensor; at least one aircraft position sensor; at least one groundspeed sensor; and/or any other sensors commonly installed in aircraft. The sensors 308 may be configured to output sensor data (e.g., aircraft position and/or speed) to some or all of the computing devices (e.g., 306, 310A, and/or 310B).

The computing device 310A may be implemented as any suitable computing device, such as an AMM computing device. As shown in FIG. 5, the computing device 310A may include the elements of the computing device 310 and may include at least one processor 502, at least one memory 504, and/or at least one storage 506, some or all of which may be communicatively coupled at any given time. The processor 502 may be configured to run various software applications (e.g., an AMM application) or computer code stored (e.g., maintained) in a non-transitory computer-readable medium (e.g., memory 504 and/or storage 506) and configured to execute various instructions or operations. The processor 502 of the computing device 310A may be configured to perform any or all of the operations disclosed throughout. For example, the processor 502 of the computing device 310A may be configured to: receive sensor data from the sensors 308; receive aircraft state data and/or airport surface data; execute the AMM application; generate data and views of an AMM; output, to the at least one display (e.g., 402), a first view of an AMM having a first map range, the AMM depicting a location of the aircraft 104 on an airport surface; based at least on the aircraft state data and the airport surface data, change the first view of the AMM having the first map range to a second view of the AMM having a second map range; and/or output, to the at least one display (e.g., 402), the second view of the AMM having the second map range. In some embodiments, the aircraft state data includes the sensor data, is derived from the sensor data, or includes some sensor data and is derived from at least one other portion of the sensor data. For example, the aircraft state data may include information of at least one of: an aircraft position relative to the airport surface or a ground speed of the aircraft 104.

In some embodiments, the aircraft state data may include information of the ground speed, and the at least one processor 502 of the computing device 310A may be further configured to: determine that the ground speed has decreased by a predetermined threshold amount; and change the first view of the AMM having the first map range to the second view of the AMM having the second map range, wherein the second map range is less than the first map range.

In some embodiments, the aircraft state data may include information of the ground speed, and the at least one processor 502 of the computing device 310A may be further configured to: determine that the ground speed has increased by a predetermined threshold amount; and change the first view of the AMM having the first map range to the second view of the AMM having the second map range, wherein the second map range is greater than the first map range.

In some embodiments, the aircraft state data may include information of the aircraft position relative to the airport surface, and the at least one processor 502 of the computing device 310A may be further configured to: determine that the aircraft position relative to the airport surface is indicative that the aircraft is approaching within a predetermined proximity to or has entered a predetermined incursion zone; and change the first view of the AMM having the first map range to the second view of the AMM having the second map range, wherein the second map range is less than the first map range.

In some embodiments, the aircraft state data may include information of the aircraft position relative to the airport surface, and the at least one processor 502 of the computing device 310A may be further configured to: determine that the aircraft position relative to the airport surface is indicative that the aircraft has exited a predetermined incursion zone; and change the first view of the AMM having the first map range to the second view of the AMM having the second map range, wherein the second map range is greater than the first map range.

In some embodiments, the aircraft state data may include information of the aircraft position relative to the airport surface, and the at least one processor 502 of the computing device 310A may be further configured to: determine that the aircraft position relative to the airport surface is indicative that the aircraft is approaching within a predetermined proximity to at least one of: a building or a deicing zone; and change the first view of the AMM having the first map range to the second view of the AMM having the second map range, wherein the second map range is less than the first map range.

In some embodiments, the aircraft state data may include information of the aircraft position relative to the airport surface, and the at least one processor 502 of the computing device 310A may be further configured to: determine that the aircraft position relative to the airport surface is indicative that the aircraft is approaching a predetermined amount of an uninterrupted taxiway or runway section; and change the first view of the AMM having the first map range to the second view of the AMM having the second map range, wherein the second map range is greater than the first map range.

The computing device 310B may be implemented as any suitable computing device, such as an airport surface database computing device. As shown in FIG. 5, the computing device 310B may include the elements of the computing device 310 and may include at least one processor 502, at least one memory 504, and/or at least one storage 506, some or all of which may be communicatively coupled at any given time. The processor 502 may be configured to run various software applications (e.g., a database application) or computer code stored (e.g., maintained) in a non-transitory computer-readable medium (e.g., memory 504 and/or storage 506) and configured to execute various instructions or operations. The processor 502 of the computing device 310B may be configured to perform any or all of the operations disclosed throughout. For example, the processor 502 of the computing device 310B may be configured to output airport surface data (which may be stored in the memory 504 and/or storage 506 of the computing device 3106) to the computing device 310A.

For example, at least one processor (e.g., the at least one processor 404, the at least one processor 502 of the computing device 310A, and/or the at least one processor 502 of the computing device 310B) may be configured to perform (e.g., collectively perform, if more than one processor) any or all of the operations disclosed throughout.

Figure 6:
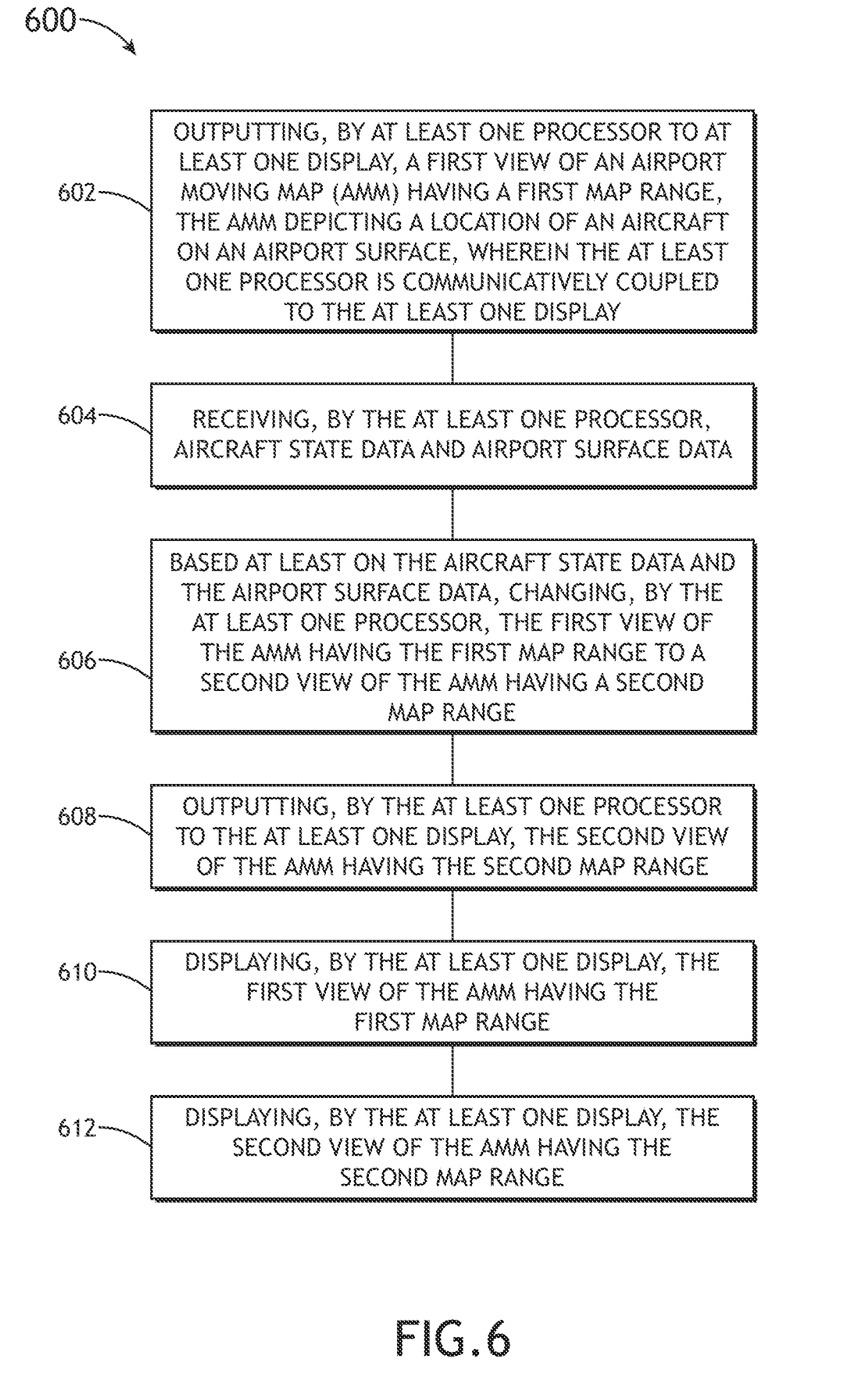
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include outputting, by at least one processor to at least one display, a first view of an airport moving map (AMM) having a first map range, the AMM depicting a location of an aircraft on an airport surface, wherein the at least one processor is communicatively coupled to the at least one display.

A step 604 may include receiving, by the at least one processor, aircraft state data and airport surface data.

A step 606 may include based at least on the aircraft state data and the airport surface data, changing, by the at least one processor, the first view of the AMM having the first map range to a second view of the AMM having a second map range.

A step 608 may include outputting, by the at least one processor to the at least one display, the second view of the AMM having the second map range.

A step 610 may include displaying, by the at least one display, the first view of the AMM having the first map range.

A step 612 may include displaying, by the at least one display, the second view of the AMM having the second map range.

Further, the method 600 may include any of the operations disclosed throughout.

As will be appreciated from the above, embodiments of the inventive concepts disclosed herein may be directed to a system and a method configured to, based at least on aircraft state data and airport surface data, change a first view of an airport moving map (AMM) having a first map range to a second view of the AMM having a second map range.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one processor;
at least one sensor configured to output sensor data to the at least one processor; and
at least one display;
wherein the at least one processor is communicatively coupled to the at least one display, the at least one processor configured to:
output, to the at least one display, a first view of an airport moving map (AMM) having a first map range, the AMM depicting a location of an aircraft on an airport surface;
receive aircraft state data and airport surface data, wherein the aircraft state data includes information of an aircraft position relative to the airport surface and a speed, wherein the aircraft state data includes the sensor data, is derived from the sensor data, or includes some sensor data and is derived from at least one other portion of the sensor data;
determine that at least one of: (a) the aircraft position relative to the airport surface is indicative that the aircraft is approaching within a predetermined proximity to or has entered a predetermined incursion zone, wherein the predetermined incursion zone is a predetermined area of the airport surface where a likelihood of a collision is elevated, (b) the aircraft position relative to the airport surface is indicative that the aircraft has exited the predetermined incursion zone, (c) the aircraft position relative to the airport surface is indicative that the aircraft is approaching within a predetermined proximity to at least one of a building or a deicing zone, or (d) the aircraft position relative to the airport surface is indicative that the aircraft is approaching a predetermined amount of an uninterrupted taxiway or runway section;

based at least on the aircraft state data, the airport surface data, and the determination that at least one of: (a) the aircraft position relative to the airport surface is indicative that the aircraft is approaching within the predetermined proximity to or has entered the predetermined incursion zone, (b) the aircraft position relative to the airport surface is indicative that the aircraft has exited the predetermined incursion zone, (c) the aircraft position relative to the airport surface is indicative that the aircraft is approaching within the predetermined proximity to the at least one of the building or the deicing zone, or (d) the aircraft position relative to the airport surface is indicative that the aircraft is approaching the predetermined amount of the uninterrupted taxiway or runway section, change the first view of the AMM having the first map range to a second view of the AMM having a second map range; and output, to the at least one display, the second view of the AMM having the second map range;

wherein the at least one display is configured to:

display the first view of the AMM having the first map range; and display the second view of the AMM having the second map range.

2. The system of claim 1, wherein the first map range is greater than the second map range.

3. The system of claim 1, wherein the first map range is less than the second map range.

4. The system of claim 1, wherein the at least one processor is further configured to: determine that the aircraft position relative to the airport surface is indicative that the aircraft is approaching within the predetermined proximity to or has entered the predetermined incursion zone; and based at least on the aircraft state data, the airport surface data, and the determination that (a) the aircraft position relative to the airport surface is indicative that the aircraft is approaching within the predetermined proximity to or has entered the predetermined incursion zone, change the first view of the AMM having the first map range to the second view of the AMM having the second map range, wherein the second map range is less than the first map range.

5. The system of claim 1, wherein the at least one processor is further configured to: determine that the aircraft position relative to the airport surface is indicative that the aircraft has exited the predetermined incursion zone; and based at least on the aircraft state data, the airport surface data, and the determination that (b) the aircraft position relative to the airport surface is indicative that the aircraft has exited the predetermined incursion zone, change the first view of the AMM having the first map range to the second view of the AMM having the second map range, wherein the second map range is greater than the first map range.

6. The system of claim 1, wherein the at least one processor is further configured to: determine that the aircraft position relative to the airport surface is indicative that the aircraft is approaching within the predetermined proximity to the deicing zone; and based at least on the aircraft state data, the airport surface data, and the determination that (c) the aircraft position relative to the airport surface is indicative that the aircraft is approaching within the predetermined proximity to the deicing zone, change the first view of the AMM having the first map range to the second view of the AMM having the second map range, wherein the second map range is less than the first map range.

7. The system of claim 1, wherein the at least one processor is further configured to: determine that the aircraft position relative to the airport surface is indicative that the aircraft is approaching the predetermined amount of the uninterrupted taxiway or runway section; and based at least on the aircraft state data, the airport surface data, and the determination that (d) the aircraft position relative to the airport surface is indicative that the aircraft is approaching the predetermined amount of the uninterrupted taxiway or runway section, change the first view of the AMM having the first map range to the second view of the AMM having the second map range, wherein the second map range is greater than the first map range.

8. The system of claim 1, wherein the at least one processor is further configured to: determine that the aircraft position relative to the airport surface is indicative that the aircraft is approaching within the predetermined proximity to the building; and based at least on the aircraft state data, the airport surface data, and the determination that (c) the aircraft position relative to the airport surface is indicative that the aircraft is approaching within the predetermined proximity to the building, change the first view of the AMM having the first map range to the second view of the AMM having the second map range, wherein the second map range is less than the first map range.

9. A method, comprising:

outputting, by at least one sensor, sensor data to at least one processor;

outputting, by the at least one processor to at least one display, a first view of an airport moving map (AMM) having a first map range, the AMM depicting a location of an aircraft on an airport surface, wherein the at least one processor is communicatively coupled to the at least one display;

receiving, by the at least one processor, aircraft state data and airport surface data, wherein the aircraft state data includes information of an aircraft position relative to the airport surface and a speed, wherein the aircraft state data includes the sensor data, is derived from the sensor data, or includes some sensor data and is derived from at least one other portion of the sensor data;

determining, by the at least one processor, that at least one of: (a) the aircraft position relative to the airport surface is indicative that the aircraft is approaching within a predetermined proximity to or has entered a predetermined incursion zone, wherein the predetermined incursion zone is a predetermined area of the airport surface where a likelihood of a collision is elevated, (b) the aircraft position relative to the airport surface is indicative that the aircraft has exited the predetermined incursion zone, (c) the aircraft position relative to the airport surface is indicative that the aircraft is approaching within a predetermined proximity to at least one of a building or a deicing zone, or (d) the aircraft position relative to the airport surface is indicative that the aircraft is approaching a predetermined amount of an uninterrupted taxiway or runway section;

based at least on the aircraft state data, the airport surface data, and the determination that at least one of: (a) the aircraft position relative to the airport surface is indicative that the aircraft is approaching within the predetermined proximity to or has entered the predetermined incursion zone, (b) the aircraft position relative to the airport surface is indicative that the aircraft has exited the predetermined incursion zone, (c) the aircraft position relative to the airport surface is indicative that the aircraft is approaching within the predetermined proximity to the at least one of the building or the deicing zone, or (d) the aircraft position relative to the airport surface is indicative that the aircraft is approaching the predetermined amount of the uninterrupted taxiway or runway section, changing, by the at least one processor, the first view of the AMM having the first map range to a second view of the AMM having a second map range;

outputting, by the at least one processor to the at least one display, the second view of the AMM having the second map range;

displaying, by the at least one display, the first view of the AMM having the first map range; and displaying, by the at least one display, the second view of the AMM having the second map range.

10. The method of claim 9, wherein the first map range is greater than the second map range.

11. The method of claim 9, wherein the first map range is less than the second map range.

\* \* \* \* \*